(12) United States Patent
Moon

(10) Patent No.: US 10,819,845 B2
(45) Date of Patent: Oct. 27, 2020

(54) COUNTRY-SPECIFIC TELEPHONE NUMBER SYSTEM ANALYSIS SYSTEM USING MACHINE LEARNING TECHNIQUE, AND TELEPHONE CONNECTION METHOD USING SAME

(71) Applicant: VIMIO CO. LTD, Seoul (KR)

(72) Inventor: Bong Jae Moon, Seoul (KR)

(73) Assignee: VIMIO CO. LTD, Seoul (KR)

( * ) Notice: Subject to any disclaimer, the term of this patent is extended or adjusted under 35 U.S.C. 154(b) by 0 days.

(21) Appl. No.: 16/345,475

(22) PCT Filed: Oct. 30, 2017

(86) PCT No.: PCT/KR2017/012055
§ 371 (c)(1),
(2) Date: May 31, 2019

(87) PCT Pub. No.: WO2018/080254
PCT Pub. Date: May 3, 2018

(65) Prior Publication Data
US 2019/0312968 A1 Oct. 10, 2019

(30) Foreign Application Priority Data
Oct. 28, 2016 (KR) .................. 10-2016-0141896

(51) Int. Cl.
*H04M 3/22* (2006.01)
*G06N 20/00* (2019.01)
(Continued)

(52) U.S. Cl.
CPC .......... *H04M 3/229* (2013.01); *G06K 9/6215* (2013.01); *G06N 20/00* (2019.01); *G06N 99/00* (2013.01); *H04M 3/42* (2013.01); *H04M 15/00* (2013.01)

(58) Field of Classification Search
CPC ........ G06K 9/6215; G06N 5/04; G06N 20/00; G06N 99/00; H04M 1/274; H04M 3/229;
(Continued)

(56) References Cited

U.S. PATENT DOCUMENTS 5,475,743 A * 12/1995 Nixon ............... H04M 1/27485
379/355.07
5,903,638 A * 5/1999 Welter, Jr. ........... H04M 3/4228
379/112.04

(Continued)

FOREIGN PATENT DOCUMENTS

KR 20040044824 5/2004
KR 100719130 5/2007

(Continued)

OTHER PUBLICATIONS

International Search Report—PCT/KR2017/012055 dated Feb. 6, 2018.

*Primary Examiner* — Gerald Gauthier
(74) *Attorney, Agent, or Firm* — Cantor Colburn LLP

(57) ABSTRACT

Provided is a country-specific telephone number system analysis system. The system includes a telephone number system analysis logic server; a number analysis machine learning system; a country-specific international call service provider information database; a country-specific telephone number system information database; and a telephone call connection logic database. The telephone number system analysis logic server receives a target telephone number of a telephone call from a user terminal, and checks whether the target telephone number conforms to an international telephone number system protocol. When it is determined that the target telephone number does not conform to the international telephone number system protocol, the number analysis machine learning system identifies a country corresponding to the target telephone number by accessing the
(Continued)

country-specific telephone number system information database. When the country and an international call service provider are identified by the number analysis machine learning system, the target telephone number is dialed after adding a dial code of the international call service provider and a country code as prefixes before the target telephone number, based on the telephone call connection logic database.

16 Claims, 10 Drawing Sheets

(51) Int. Cl.
    *G06K 9/62*     (2006.01)
    *H04M 15/00*     (2006.01)
    *H04M 3/42*     (2006.01)
    *G06N 99/00*     (2019.01)

(58) Field of Classification Search
    CPC .... H04M 3/42; H04M 15/00; H04M 1/27485; H04M 3/22; H04M 3/2281; G06F 17/30533; G06Q 10/10
    USPC .............. 358/1.15; 370/352, 259; 379/88.03, 379/88.11, 114.02, 142.04, 142.06, 198, 379/221.02, 243, 350, 355.07, 142.1; 455/414.1, 426.1, 435.1, 563, 404.1, 455/414.3; 709/225, 248, 206; 715/860; 706/21
    See application file for complete search history.

(56) References Cited

U.S. PATENT DOCUMENTS

| | | | | |
|---|---|---|---|---|
| 6,314,287 | B1* | 11/2001 | Leickel | H04W 88/06 455/426.1 |
| 6,442,258 | B1* | 8/2002 | Mashinsky | H04M 15/00 379/114.02 |
| 6,697,860 | B1* | 2/2004 | Kung | H04L 29/06 709/225 |
| 7,835,504 | B1* | 11/2010 | Donald | H04L 51/38 379/88.11 |
| 7,917,655 | B1* | 3/2011 | Coomer | G06Q 10/107 709/206 |
| 8,938,062 | B2* | 1/2015 | Low | H04L 12/2856 370/352 |
| 9,774,726 | B1* | 9/2017 | Jenkins | H04L 65/1076 |
| 10,484,532 | B1* | 11/2019 | Newman | H04M 3/5183 |
| 2002/0076009 | A1* | 6/2002 | Denenberg | H04M 1/271 379/88.03 |
| 2002/0116380 | A1* | 8/2002 | Chen | H04M 1/27485 |
| 2005/0105713 | A1* | 5/2005 | Carlson | H04M 1/27485 379/350 |
| 2006/0009264 | A1* | 1/2006 | Seo | H04M 1/56 455/563 |
| 2006/0154661 | A1* | 7/2006 | Gonen | H04M 15/00 455/435.1 |
| 2007/0008952 | A1* | 1/2007 | Miao | H04L 29/06027 370/352 |
| 2007/0127661 | A1* | 6/2007 | Didcock | H04M 3/44 379/198 |
| 2010/0005426 | A1* | 1/2010 | Van | G06F 40/284 715/860 |
| 2010/0184413 | A1* | 7/2010 | Jo | H04M 15/80 455/414.1 |
| 2011/0091027 | A1* | 4/2011 | Xing | H04M 1/57 379/142.1 |
| 2011/0116613 | A1* | 5/2011 | Hlin | H04M 1/27485 379/142.06 |
| 2011/0255678 | A1* | 10/2011 | Millett | H04M 3/42068 379/142.04 |
| 2013/0063768 | A1* | 3/2013 | Berke | H04N 1/3209 358/1.15 |
| 2014/0323101 | A1* | 10/2014 | Jia | H04M 1/72572 455/414.1 |
| 2015/0249742 | A1* | 9/2015 | Li | G06Q 30/016 455/414.1 |
| 2019/0095801 | A1* | 3/2019 | Saillet | G06N 5/04 |
| 2019/0312968 | A1* | 10/2019 | Moon | G06N 20/00 |

FOREIGN PATENT DOCUMENTS

| | | |
|---|---|---|
| KR | 20070110697 | 11/2007 |
| KR | 20090038248 | 4/2009 |
| KR | 20100134189 | 12/2010 |

* cited by examiner

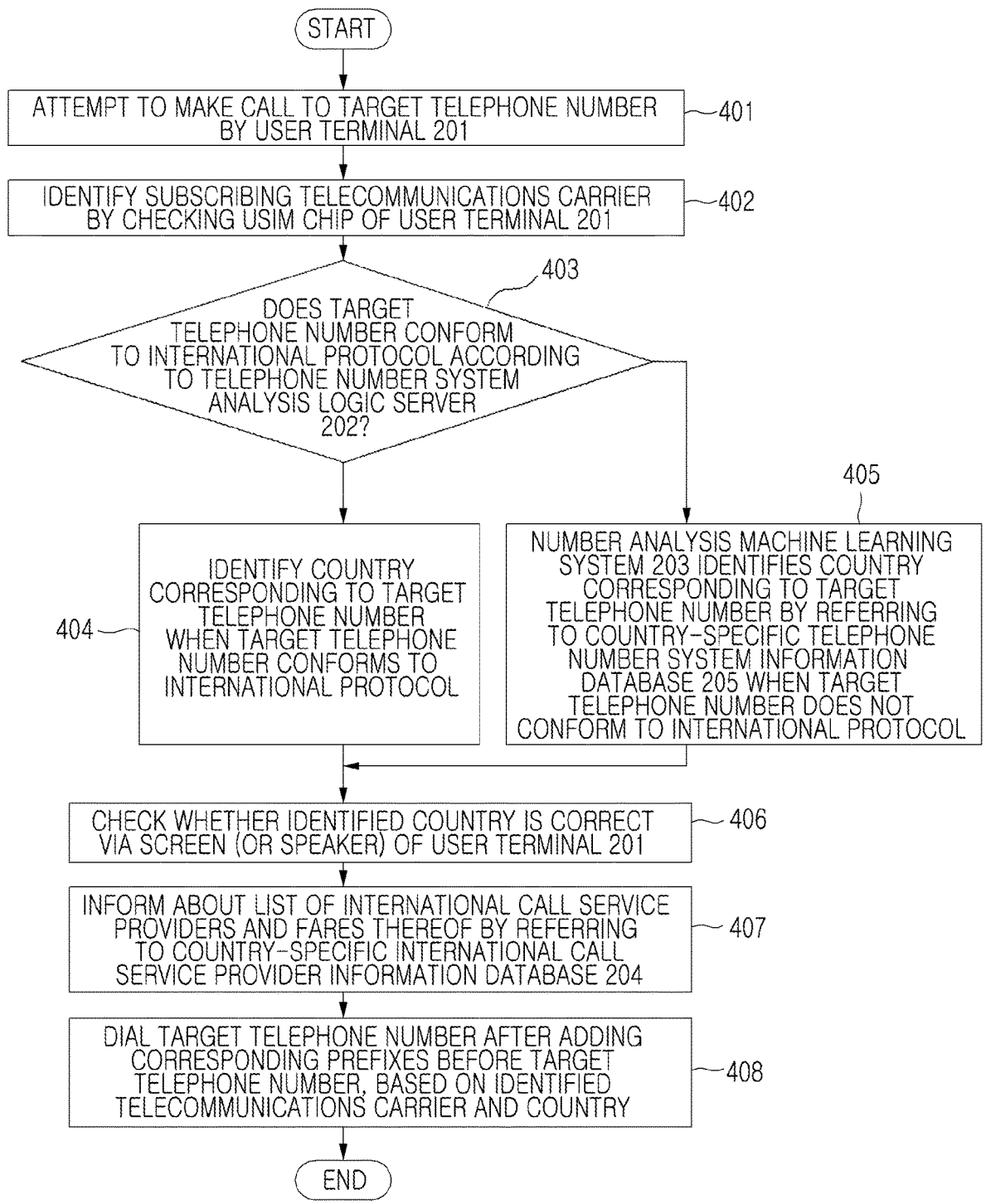

COUNTRY-SPECIFIC TELEPHONE NUMBER SYSTEM ANALYSIS SYSTEM USING MACHINE LEARNING TECHNIQUE, AND TELEPHONE CONNECTION METHOD USING SAME

TECHNICAL FIELD

The present invention relates to a country-specific telephone number system analysis system by using a machine learning technique, and a telephone call connection method using the same.

BACKGROUND ART

In recent years, the number of people who go abroad for travel or business is increasing. Generally, when people go abroad, they take their phones (smartphones) with themselves. When a situation in which a telephone call is made to a number stored in their phones occurs, the telephone call may not be smoothly connected for the following reasons.

For example, it is assumed that a telephone number "010-1234-5678" is currently stored with the name of "Hong Kil Dong" in the address book of the smartphone. In this case, when a telephone call is made to Hong Gil-dong while roaming abroad or by employing a universal subscriber identity module (USIM) chip locally, the telephone number is recognized as a wrong number and thus a telephone call cannot be made. This problem also occurs when transmitting a text message such as a short message service (SMS) or a multimedia messaging service (MMS), as well as when making a telephone call.

That is, "Hong Gil-dong, 010-1234-5678" is a Korean telephone number, and thus, in order to call this number in another country (e.g., the United States) other than Korea, a US telecommunications carrier will be used and an attempt will be made to call "010-1234-5678" which is a US telephone number. Therefore, the desired call cannot be connected.

In order to solve this problem, some Korean telecommunications carriers encourage to use a function of "calling to South Korea" through a dedicated application when roaming, but the function can only be used in a limited number of terminals (in particular, not on Apple iPhone) and only users roaming through the telecommunications carriers can use the function. Furthermore, the function is not available when attempting to make a telephone call to a country other than South Korea.

In addition, there are numerous international call service providers in each country (e.g., 001, 002, 00700, etc. in the case of South Korea), and call rate systems thereof are different from each other. A Korean traveler visiting the United States have to dial "011+82+10+1234-5678" in order to call Hong Kil Dong (010-1234-5678) in South Korea without a problem. However, this is the case for a specific telecommunications carrier in the United States. When the traveler is visiting another country, the traveler needs to dial another number system to make a telephone call or transmit a text message to Hong Kil Dong.

In order to solve this problem, the contact information of Hong Kil-dong, which is saved as "010-1234-5678", is required to be changed to "011+82+10-1234-5678" and be changed again after the traveler visits another country or returns to South Korea. In addition, even if the number is actually changed in a contact list, it is difficult for a user to individually select one of international call service providers having different call rate systems by countries or telecommunications carriers, or to check call charges thereof. Thus, huge international call charges and roaming charges incurred accordingly will be a burden on the user.

Technical Problem

Generally, when going abroad for business or travel, a telephone call is made or data is used by roaming or by using a USIM chip of a local telecommunications carrier. In South Korea, all three mobile carriers such as SKT, KT and LGT provide an international roaming service to connect telephone calls and provide a data service. However, the concept of roaming is understood to mean a method of using a communication network of a specific local telecommunications carrier, and thus, it is necessary to make a telephone call according to a standard of the local telecommunications carrier so as to have a telephone call locally. For example, in order to make an international call from South Korea to the United States, a telephone call needs to be dialed in the format of 'an international call service provider number (e.g., 001, 002, or 00700)+country code+US telephone number'. On the other hand, in order to make a telephone call from the United States to South Korea, a telephone call needs to be dialed in the format of '011 (e.g., in the case of Verizon which is a US telecommunications carrier)+Korea country code (82)+Korean telephone number'.

In other words, it is necessary to know in advance a telephone call connection format different according to each country, each telecommunications carrier, or each international call service provider to smoothly make a telephone call. A more difficult problem is that it is difficult to determine how to store such telephone call connection formats in contacts. For example, contacts in the United States of people residing in South Korea are required to be stored, for example, in the format of '001+1+a telephone number in the United States', so that a telephone call can be directly made to the contacts by searching for the contacts. However, when a telephone call is made in the United States to the contacts stored as described above, a voice message informing of a wrong number is received from a local telecommunications carrier. This is because a number starting with '001+1' does not exist in the telephone number system of the United States.

In order to solve the existing problems, some telecommunications carriers, for example, in South Korea provide users with two call request buttons, e.g., a "making a telephone call to South Korea" button and a "making a national call" button, only for some phone models when roaming. However, the function is a service available only when a specific application is installed in a specific device among phones roaming through a specific telecommunications carrier in South Korea, and is not included in call functions provided as default inmost terminals (Samsung Galaxy, Apple iPhone, etc.). Furthermore, the function is not available when a local telephone number is given to a cellular phone, which was used in South Korea, by exchanging a USIM chip with either that provided from a local telecommunications carrier or a prepaid USIM chip without requesting a roaming service through a telecommunications carrier in South Korea.

To address the above-described problem, the present invention is directed to providing a technique for making a telephone call to a contact stored in an address book without causing inconvenience through any telecommunications carriers throughout the world. The present invention is also directed to providing a service for comparing conditions, e.g., fares, etc., of local international call service providers to select a desired international call service provider when an international call is made anywhere in the world, thereby activating services through business partnerships with local international call service providers.

Solution to Problem

According to the present invention, there is provided a country-specific telephone number system analysis system including a telephone number system analysis logic server that is configured to receive a target telephone number to which a telephone call is to be made from a user terminal, and to determine whether the target telephone number conforms to an international telephone number system protocol; a number analysis machine learning system that is configured to learn in advance a country corresponding to each telephone number format by machine learning and to store a result of learning in a country-specific telephone number system information database, and is configured to identify a country corresponding to the target telephone number by accessing the country-specific telephone number system information database when the telephone number system analysis logic server determines that the target telephone number does not conform to the international telephone number system protocol; a country-specific international call service provider information database that is operated in association with the number analysis machine learning system and stores information regarding international call service providers located in each country; and a telephone call connection logic database that is configured to dial the target telephone number after adding a dial code of an international call service provider and a code of the country as prefixes before the target telephone number when the country and the international call service provider are identified by the number analysis machine learning system.

Preferably, when a telephone call request is received from the user terminal, the target telephone number of the telephone call request is received.

Preferably, information stored in the country-specific telephone number system information database is obtained by selecting a specific country, collecting information regarding numbers estimated to be telephone numbers by crawling a plurality of home pages each having a server located in the specific country, identifying a pattern of the numbers, and repeatedly performing the crawling and pattern identification with respect to other countries. The pattern may be identified by obtaining big data of telephone numbers of each country.

Preferably, when a telephone call request is received from the user terminal, a list of call service providers located in the country where the user terminal is located is displayed on a screen of the user terminal or is output by voice via a speaker of the user terminal, based on information stored in the country-specific international call service provider information database.

Preferably, costs to be incurred when a telephone call is made to the country corresponding to the target telephone number through each of the call service providers listed in the list of call service providers are informed via the screen or the speaker of the user terminal while the list of call service providers is displayed on the screen of the user terminal or is output by voice via the speaker.

Preferably, the information stored in the country-specific telephone number system information database is periodically updated by machine learning.

Preferably, when a country corresponding to the target telephone number of the user terminal cannot be identified, the number analysis machine learning system checks pattern similarities with data stored in the country-specific telephone number system information database, and displays a plurality of candidate countries on the screen of the user terminal or outputs the plurality of candidate countries by voice via the speaker of the user terminal.

Preferably, the information regarding the international call service providers stored in the country-specific international call service provider information database includes information of call charges to be incurred when a telephone call is made to a foreign country through each of the international call service providers.

According to the present invention, there is provided a telephone call connection method which is performed by the above-described country-specific telephone number system analysis system, the telephone call connection method including (a) a step in which a user terminal attempts to make a telephone call to a target telephone number or transmit a text message to the target telephone number; (b) a step in which the user terminal transmits the target telephone number to a telephone number system analysis logic server; (c) a step in which the telephone number system analysis logic server checks whether the received target telephone number conforms to an international telephone number system protocol; (d) a step in which the telephone number system analysis logic server identifies a country corresponding to the target telephone number when it is determined that the target telephone number conforms to the international telephone number system protocol; (e) a step in which a number analysis machine learning system which has received the target telephone number from the telephone number system analysis logic server identifies a country corresponding to the target telephone number by accessing a country-specific telephone number system information database when it is determined that the target telephone number does not conform to the international telephone number system protocol; and (f) a step of dialing the target telephone number in consideration of the country identified in the step (d) or (e), which includes selecting one of international call service providers whose information is stored in a country-specific international call service provider information database and dialing the target telephone number after adding a dial code of the selected international call service provider and a code of the country as prefixes before the target telephone number.

Preferably, the telephone call connection method further includes a step in which the user terminal or the telephone number system analysis logic server identifies a country corresponding to a telecommunications carrier to which the user terminal subscribes, between the steps (a) and (b) or between the steps (b) and (c).

Preferably, the identification of the country corresponding to the telecommunications carrier to which the user terminal subscribes is performed by checking a USIM chip.

Preferably, the step (f) includes dialing the target telephone number after informing about the country identified in the step (d) or (e) via the screen or speaker of the user terminal and receiving a confirmation about the country.

Preferably, the step (f) includes dialing the target telephone number after additionally providing, via the screen or speaker of the user terminal, a list of call service providers through which a telephone call is to be made to the country identified in the step (d) or (e) from a country where the user terminal is located, based on the information regarding the international call service providers stored in the country-specific international call service provider information database and thereafter receiving a confirmation about the list of international.

Preferably, the provision of the list of call service providers includes informing about call charges to be incurred when a telephone call is made or a text message is transmitted through each of the call service providers.

According to the present invention, there is provided a computer-readable recording medium having recorded thereon a program or an application for a smart device for implementing the telephone call connection method described above in a user terminal.

According to the present invention, there is provided a terminal with a screen and a speaker, the terminal having installed therein a program or an application for a smart device for implementing the telephone call connection method described above.

Advantageous Effects of Invention

According to the present invention, when a user of a cellular phone attempts to make a telephone call to a number, a country corresponding to the number is automatically identified and the automatic identification of the country corresponding to the number can be performed by comparing the number with a number system protocol of each country by a machine learning technique.

According to existing technology and technology disclosed in patents, a country corresponding to a telephone number can be identified by using only the number of digits of the telephone number, a starting number of the telephone number, etc. In contrast, according to the present invention, a country code system can be learned by a machine learning technique, and information regarding a country corresponding to a telephone number can be thereafter identified by putting the telephone number to a learned logic.

The present invention provides a technique for making a telephone call to a contact stored in an address book without causing inconvenience through any telecommunications carriers throughout the world. In addition, the present invention provides a service for comparing conditions, e.g., fares, etc., of local international call service providers to select a desired international call service provider when an international call is made anywhere in the world, thereby activating services through business partnerships with local international call service providers.

BRIEF DESCRIPTION OF DRAWINGS

FIG. 10 illustrates an example of a flowchart according to the present invention.

REFERENCE SIGN LIST

Figure 1:
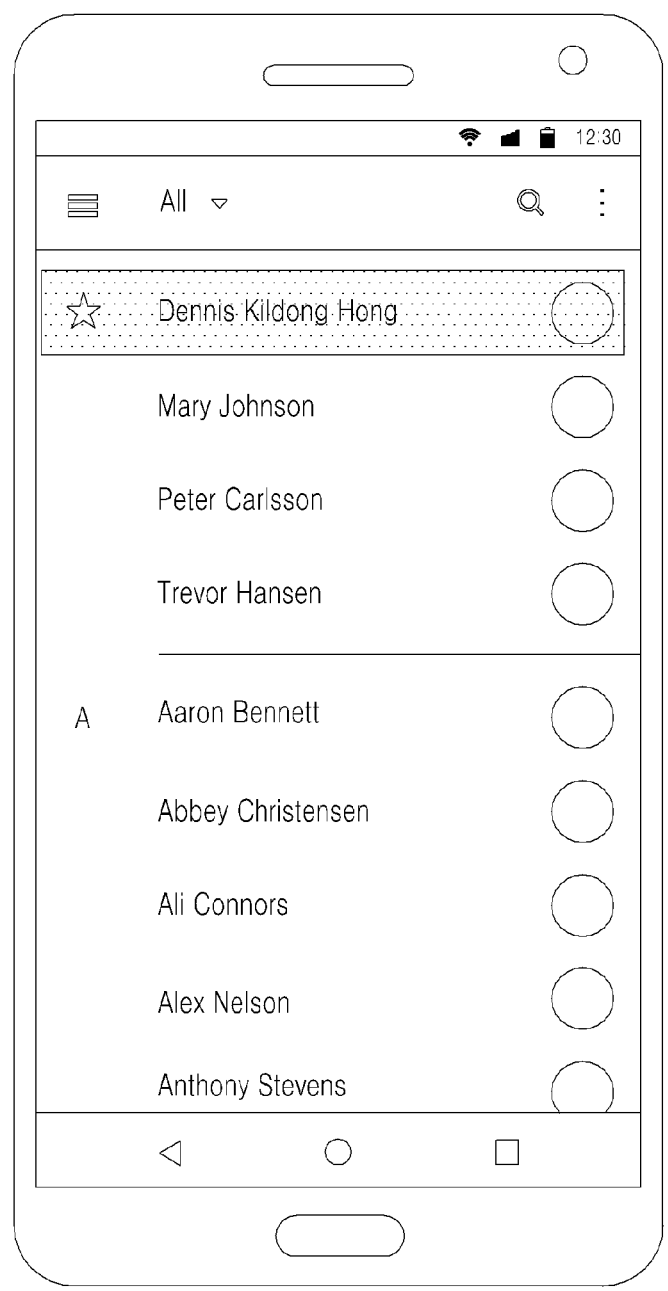
FIGS. 1 to 3 are diagrams for illustrating the related art.

201: user terminal
202: telephone number system analysis logic server
203: number analysis machine learning system
204: country-specific international call service provider information database
205: country-specific telephone number system information database
206: telephone call connection logic database

BEST MODE FOR CARRYING OUT THE INVENTION

According to the present invention, there is provided a country-specific telephone number system analysis system including a telephone number system analysis logic server that is configured to receive a target telephone number to which a telephone call is to be made from a user terminal, and to determine whether the target telephone number conforms to an international telephone number system protocol; a number analysis machine learning system that is configured to learn in advance a country corresponding to each telephone number format by machine learning and to store a result of learning in a country-specific telephone number system information database, and is configured to identify a country corresponding to the target telephone number by accessing the country-specific telephone number system information database when the telephone number system analysis logic server determines that the target telephone number does not conform to the international telephone number system protocol; a country-specific international call service provider information database that is operated in association with the number analysis machine learning system and stores information regarding international call service providers located in each country; and a telephone call connection logic database that is configured to dial the target telephone number after adding a dial code of an international call service provider and a code of the country as prefixes before the target telephone number when the country and the international call service provider are identified by the number analysis machine learning system.

Preferably, when a telephone call request is received from the user terminal, the target telephone number of the telephone call request is received.

Preferably, information stored in the country-specific telephone number system information database is obtained by selecting a specific country, collecting information regarding numbers estimated to be telephone numbers by crawling a plurality of home pages each having a server located in the specific country, identifying a pattern of the numbers, and repeatedly performing the crawling and pattern identification with respect to other countries. The pattern may be identified by obtaining big data of telephone numbers of each country.

Preferably, when a telephone call request is received from the user terminal, a list of call service providers located in the country where the user terminal is located is displayed on a screen of the user terminal or is output by voice via a speaker of the user terminal, based on information stored in the country-specific international call service provider information database.

Preferably, costs to be incurred when a telephone call is made to the country corresponding to the target telephone number through each of the call service providers listed in the list of call service providers are informed via the screen or the speaker of the user terminal while the list of call service providers is displayed on the screen of the user terminal or is output by voice via the speaker.

Preferably, the information stored in the country-specific telephone number system information database is periodically updated by machine learning.

Preferably, when a country corresponding to the target telephone number of the user terminal cannot be identified, the number analysis machine learning system checks pattern similarities with data stored in the country-specific telephone number system information database, and displays a plurality of candidate countries on the screen of the user terminal or outputs the plurality of candidate countries by voice via the speaker of the user terminal.

Preferably, the information regarding the international call service providers stored in the country-specific international call service provider information database includes information of call charges to be incurred when a telephone call is made to a foreign country through each of the international call service providers.

According to the present invention, there is provided a telephone call connection method which is performed by the above-described country-specific telephone number system analysis system, the telephone call connection method including (a) a step in which a user terminal attempts to make a telephone call to a target telephone number or transmit a text message to the target telephone number; (b) a step in which the user terminal transmits the target telephone number to a telephone number system analysis logic server; (c) a step in which the telephone number system analysis logic server checks whether the received target telephone number conforms to an international telephone number system protocol; (d) a step in which the telephone number system analysis logic server identifies a country corresponding to the target telephone number when it is determined that the target telephone number conforms to the international telephone number system protocol; (e) a step in which a number analysis machine learning system which has received the target telephone number from the telephone number system analysis logic server identifies a country corresponding to the target telephone number by accessing a country-specific telephone number system information database when it is determined that the target telephone number does not conform to the international telephone number system protocol; and (f) a step of dialing the target telephone number in consideration of the country identified in the step (d) or (e), which includes selecting one of international call service providers whose information is stored in a country-specific international call service provider information database and dialing the target telephone number after adding a dial code of the selected international call service provider and a code of the country as prefixes before the target telephone number.

Preferably, the telephone call connection method further includes a step in which the user terminal or the telephone number system analysis logic server identifies a country corresponding to a telecommunications carrier to which the user terminal subscribes between the steps (a) and (b) or between the steps (b) and (c).

Preferably, the identification of the country corresponding to the telecommunications carrier to which the user terminal subscribes is performed by checking a USIM chip.

Preferably, the step (f) includes dialing the target telephone number after informing about the country identified in the step (d) or (e) via the screen or speaker of the user terminal and receiving a confirmation about the country.

Preferably, the step (f) includes dialing the target telephone number after additionally providing, via the screen or speaker of the user terminal, a list of call service providers through which a telephone call is to be made to the country identified in the step (d) or (e) from a country where the user terminal is located, based on the information regarding the international call service providers stored in the country-specific international call service provider information database and thereafter receiving a confirmation about the list of international.

Preferably, the provision of the list of call service providers includes informing about call charges to be incurred when a telephone call is made or a text message is transmitted through each of the call service providers.

According to the present invention, there is provided a computer-readable recording medium having recorded thereon a program or an application for a smart device for implementing the telephone call connection method described above in a user terminal.

According to the present invention, there is provided a terminal with a screen and a speaker, the terminal having installed therein a program or an application for a smart device for implementing the telephone call connection method described above.

Embodiments

Hereinafter, systems and methods according to the present invention will be described with reference to the accompanying drawings.

Figure 2:
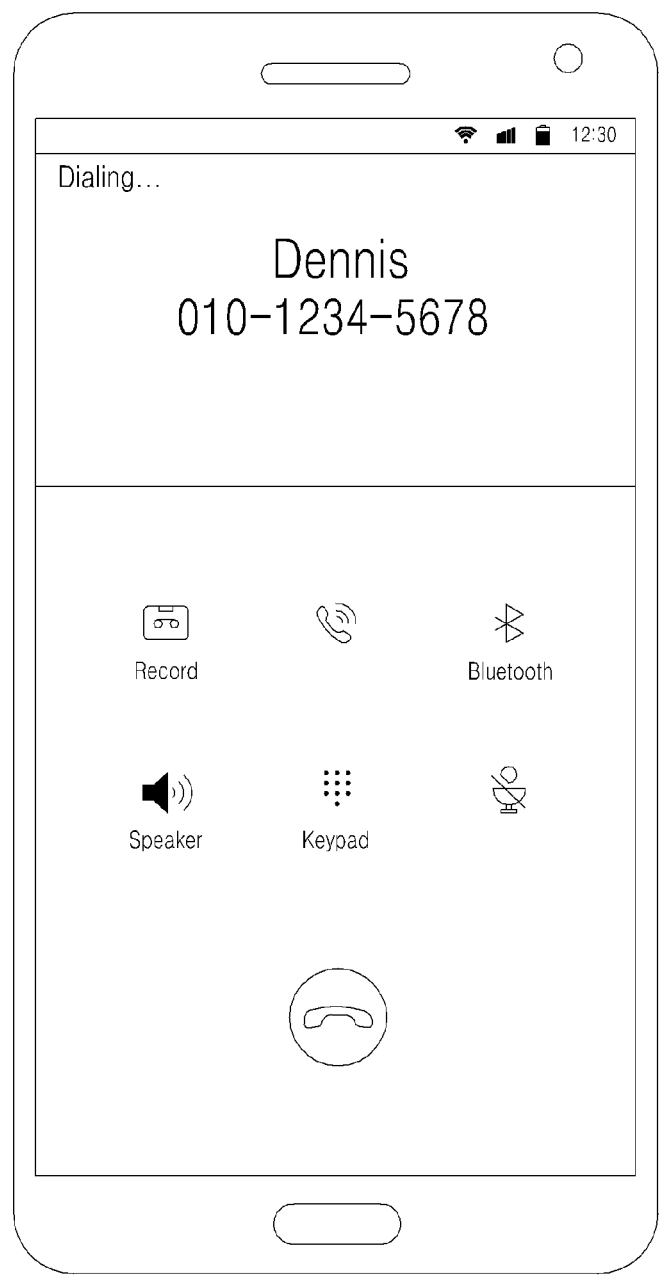
Figure 3:

FIGS. 1 to 3 are diagrams for illustrating the related art.

FIG. 1 illustrates a state in which an address book is open. It is assumed that the phone has been registered in South Korea and is currently located in the United States. Dennis Kil-dong Hong is selected from the address book, and a telephone call button is pressed.

FIG. 2 illustrates a state in which a telephone call is being connected. A telephone number of Dennis (Dennis Kil-dong Hong) is 010-1234-5678. Although not shown in the screen, it is assumed that the telephone number is a Korean telephone number.

FIG. 3 illustrates a message informing that a telephone call cannot be connected. That is, when a telephone call is made as illustrated in FIG. 2, since '010-1234-5678' is a number that does not exist in a telephone number system of the United States (a place where the phone is currently located), a message informing of a wrong number is received. In the United States, there is no telephone number system starting with 010.

Figure 4:
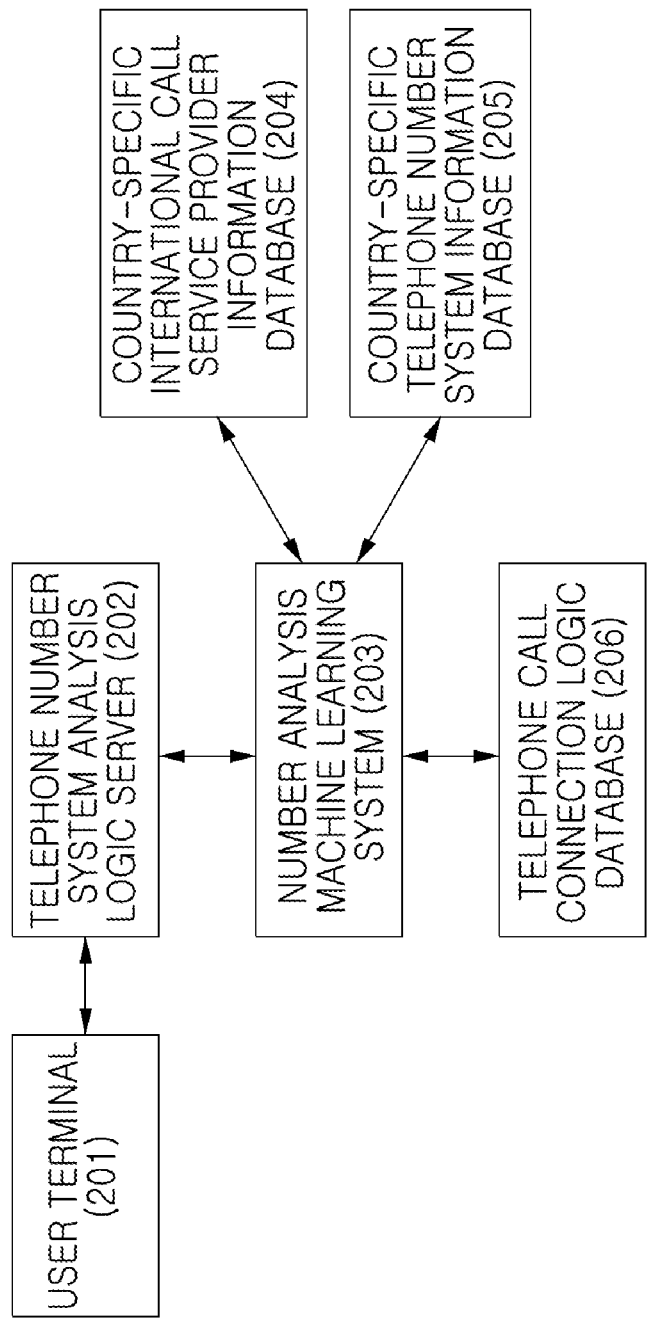
FIGS. 4 and 5 are block diagrams illustrating a flow of data according to the present invention.

FIG. 4 is a block diagram illustrating a flow of data according to the present invention.

A user terminal 201 requests to make a telephone call to a specific telephone number or to transmit a text message to the specific number. Then, the specific telephone number (hereinafter also referred to as the 'target telephone number') is transmitted to a telephone number system analysis logic server 202.

The telephone number system analysis logic server 202 verifies whether the telephone number (the target telephone number) conforms to a telephone number system protocol. The telephone number system protocol includes, for example, the following recommendations according to the numbering plan of the International Telecommunications Union Telecommunication Standardization Sector (ITU-T).

E.160: Definition of a telephone numbering plan

E.163: Regulation of an international telephone numbering plan

E.164: Regulation of a numbering plan of the ISDN era

E.165: Recommendation of Timetable for coordinated implementation with the existing numbering plan E.166: ISDN-based numbering plan between different numbering plans E.168: Numbering plan for a Universal Personal Communication (UPT) service (1993)

F.69: Numbering plan of a public telex network

X.121: Numbering plan of a public data network

X.122: Data network-based numbering plan between different numbering plans

E.166/X.122: Recommendation which is a combination of E.166 and X.122 described above (1992)

For example, according to the E.164 recommendation, there are a country code (CC) (having a variable length) which is a number assigned to each country or continent, a national destination code (NDC) (not exceeding 15 digits) which is a number managed by each country, and a subscriber number (SN: a general subscriber number).

If all the countries around the world follow the above recommendations, a country corresponding to a domestic telephone number of each country may be identified only based on the domestic telephone number. However, since not every country around the world follows the above recommendations and each country arbitrarily sets the own domestic numbering system, some confusion may arise. For example, about 26 countries of so-called advanced countries follow the above recommendations, and 100 or more countries do not follow the above recommendations.

The international protocol (international telephone number system protocol) referred to in the present invention is not necessarily limited to the above protocol, and may be another protocol of an equivalent level or equivalent details.

The telephone number system analysis logic server 202 according to the present invention checks whether a target telephone number for making a telephone call (or for transmitting a text message) using the user terminal 201 conforms to the international protocol (the international telephone number system protocol) described above as an example. When the target telephone number conforms to the international protocol, a country corresponding to the target telephone number may be identified without additional procedures.

Next, the target telephone number is transmitted to a number analysis machine learning system 203. Machine learning need not be applied when the target telephone number conforms to the above number system protocol, but it may not be easy to identify the country corresponding to the target telephone number when the target telephone number does not conform to the above number system protocol. The number analysis machine learning system 203 learns in advance a number format of telephone numbers of each country by machine learning. An example of a method using machine learning may include crawling. Crawling is a technique for collecting what looks like a telephone number by searching for webpages having addresses in a certain country (each having a server located in the country). In this way, a telephone number system of a specific country may be learned. If this procedure is repeatedly performed with respect to various countries (100 or more countries that do not follow the aforementioned recommendations), it is highly probable that a country corresponding to a given telephone number will be identified.

A database of information obtained as described above is built and stored in a country-specific telephone number system information database 205. The obtained information may be stored according to a certain rule or may be directly stored as it is. Preferably, the country-specific telephone number system information database 205 is updated periodically or in real time, rather than built once. The country-specific telephone number system information database 205 is preferably updated by machine learning.

In addition, since information related to telephone numbers of countries that do not follow the number system protocol is very likely to be stored, a specific number (or a number that is within a certain range) may not necessarily be limited to one country, and two or more candidate countries may be presented. The candidate countries are not presented without any rules but are presented through pattern matching or pattern similarities with the data stored in the country-specific telephone number system information database 205 as much as possible. The candidate countries may be presented by outputting the candidate countries to the screen of the user terminal 201. In the present specification, the outputting of the candidate countries to the screen of the user terminal 201 means that the candidate countries are output such that they can be recognized by the user of the user terminal 201, and needs to be understood to include, for example, a modified example in which the candidate countries may be output by voice such that the candidate countries can be noticed by the user even when the candidate countries are not displayed on the screen.

Meanwhile, according to the present invention, a country-specific international call service provider information database 204 may further be provided. The country-specific international call service provider information database 204 accessible to the number analysis machine learning system 203 stores information regarding international call service providers of each country. For example, in the case of the United States, the country-specific international call service provider information database 204 stores information regarding Verizon, AT&T, T-Mobile, and Sprint, which are four US major telecommunications carriers, and other MVNO carriers, and information regarding services thereof (i.e., a telephone call charge per unit time, etc. when making a telephone call to a foreign country). Preferably, information regarding telecommunications carriers of all countries, such as Korea, China, and Japan, as well as the United States is sorted and stored by country, if possible.

As described above, the number analysis machine learning system 203 is connected to the country-specific international call service provider information database 204 and the country-specific telephone number system information database 205.

Data learned by the number analysis machine learning system 203 by machine learning (crawling, etc.) is stored in the country-specific telephone number system information database 205. Data stored in the country-specific international call service provider information database 204 may be obtained by machine learning, and a database of information regarding call service providers of each country may be built in advance by separately searching for the information to facilitate identification of a number system (compared to when the number system is identified as described above).

In addition, a target telephone number (i.e., a telephone number as a target for a telephone call or a text message) input via the user terminal 201 is transmitted to a telephone call connection logic database 206.

The telephone call connection logic database 206 is configured as a database of logics obtained by machine learning, and is provided in a form that can be used in a terminal. That is, when '010-1234-5678' is a target telephone number, the target telephone number can be identified as a Korean telephone number through the telephone number system analysis logic server 202, the number analysis machine learning system 203, the country-specific international call service provider information database 204, and the country-specific telephone number system information database 205. In addition, it is assumed that the user terminal is currently located in the United States. When '010-1234-5678' which follows a Korean telephone number system is directly dialed in the United States, the result described above with reference to FIG. 3 will be obtained, and thus, the telephone call connection logic database 206 provides a logic in which 'a dial number according to a telecommunications carrier in the United States+the country code of Korea' are added (i.e., as pre-fixes) before the target telephone number, considering that 'the user terminal is currently located in the United States and the target telephone number is a Korean telephone number'.

As will be described below, referring to FIG. 9, for example, a prefix to be added when Verizon is selected to make a telephone call from the United States to South Korea and a prefix to be added when T-Mobile is selected to make a telephone call from the United States to South Korea are different from each other.

As another example, when a telephone call is made to a US target telephone number by using a terminal located in South Korea, the telephone call connection logic database 206 is configured such that '001+1+US telephone number' are dialed when a 'carrier 1' is selected and '00700+1+US telephone number' are dialed when a 'carrier 2' is selected (that is, the US telephone number is dialed after adding a prefix, which is selected according to a situation, before the US telephone number), since a code '001' is assigned to the 'carrier 1' and a code '00700' is assigned to the 'carrier 2'. The number '1' after '001' or '00700' is the country code of the United States.

Figure 5:
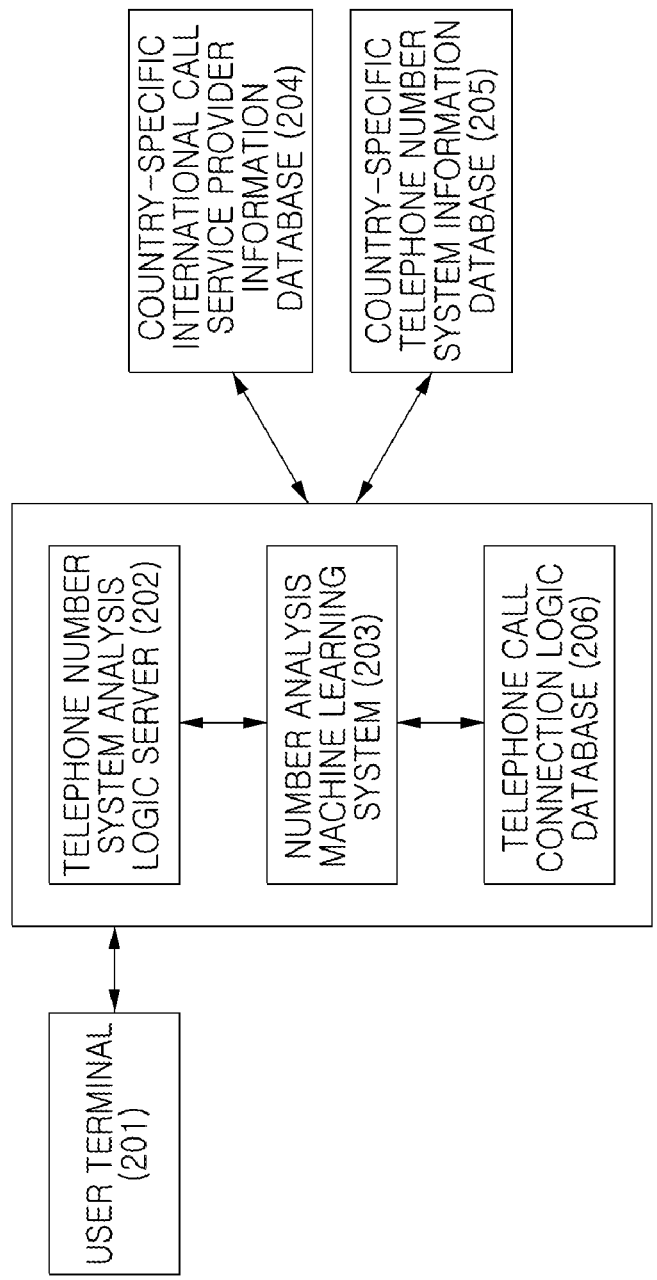

FIG. 5 is a block diagram illustrating a flow of data according to the present invention.

In the foregoing description, the server 202, the system 203, and the database 206 are described as separate blocks, but may be operated by individual devices or may be operated by one or two devices, if necessary. In FIG. 5, reference numerals 202, 203, and 206 are included in a single rectangle to illustrate the above indirectly.

Meanwhile, it is most efficient to match the country-specific international call service provider information database 204 and the country-specific telephone number system information database 205 with the number analysis machine learning system 203 as illustrated in FIG. 4, but the country-specific international call service provider information database 204 and the country-specific telephone number system information database 205 may be matched with other components (202 or 206), if necessary.

The components 202, 203, 204, 205 and 206 are conceptually classified into blocks, but two or more blocks among these blocks may be configured to be included in one device. An example in which two or more blocks among these blocks are configured to be included in one device is illustrated in FIG. 5, and these blocks may be embodied in another combination.

A process of transmitting information regarding a target telephone number from the user terminal 201 to the server 202 or the like may be installed, for example, in the form of an application in the case of a smartphone. More preferably, at the time of releasing the smartphone, the above-described procedure (that is, the process of transmitting the information regarding the target telephone number from the user terminal 201 to the server 202 or the like) is set to be implemented by a default telephone call program.

Meanwhile, for example, a scenario according to the present invention is as follows:

the telephone number system analysis logic server 202 receives a target telephone number from the user terminal 201, the telephone number system analysis logic server 202 identifies whether the target telephone number conforms to the international number system, when the target telephone number conforms to the international number system, a country corresponding to the target telephone number can be identified, and thus, a message inquiring whether the identified country is correct is output to the screen of the user terminal 201, when the target telephone number does not conform to the international number system, the country corresponding to the target telephone number cannot be directly identified, and thus, the number analysis machine learning system 203 identifies the country corresponding to the target telephone number on the basis of the country-specific telephone number system information database 205 prepared in advance, and outputs a message inquiring whether the identified (estimated) country is correct to the screen of the user terminal 201, the country-specific international call service provider information database 204 is accessed to obtain information (the selection of a telecommunications carrier, fare information, etc.) of international call service providers of the current calling country, and the information is displayed on the screen of the user terminal 201, and when the country corresponding to the target telephone number is identified and an internal call service provider through which a telephone call is to be made to the identified country is determined, the telephone call connection logic database 206 adds a corresponding pre-fix before the target telephone number.

The scenario according to the present invention includes the scenarios described above.

Although it is described above that the prefix is added, some digits of the target telephone number may be deleted, if necessary. For example, when a telephone call is made in the United States to "010-1234-5678" which is a Korea telephone number, "011" (the international call service provider code of Verizon, which is a US telecommunications carrier)+"82" (the country code of South Korea) are added, "10-1234-5678" (excluding a leading zero) is added after "82" instead of "010-1234-5678", and thereafter a resultant number is dialed.

The above example is merely an example of a scenario according to the present invention, and there may be modified examples of an equivalent level of the scenario for implementing the same operation.

FIGS. 6 to 9 are diagrams illustrating an example of a screen for connecting a telephone call according to the present invention.

The following description is based on an assumption that a telephone (the user terminal 201) is currently located in the United States.

Figure 6:
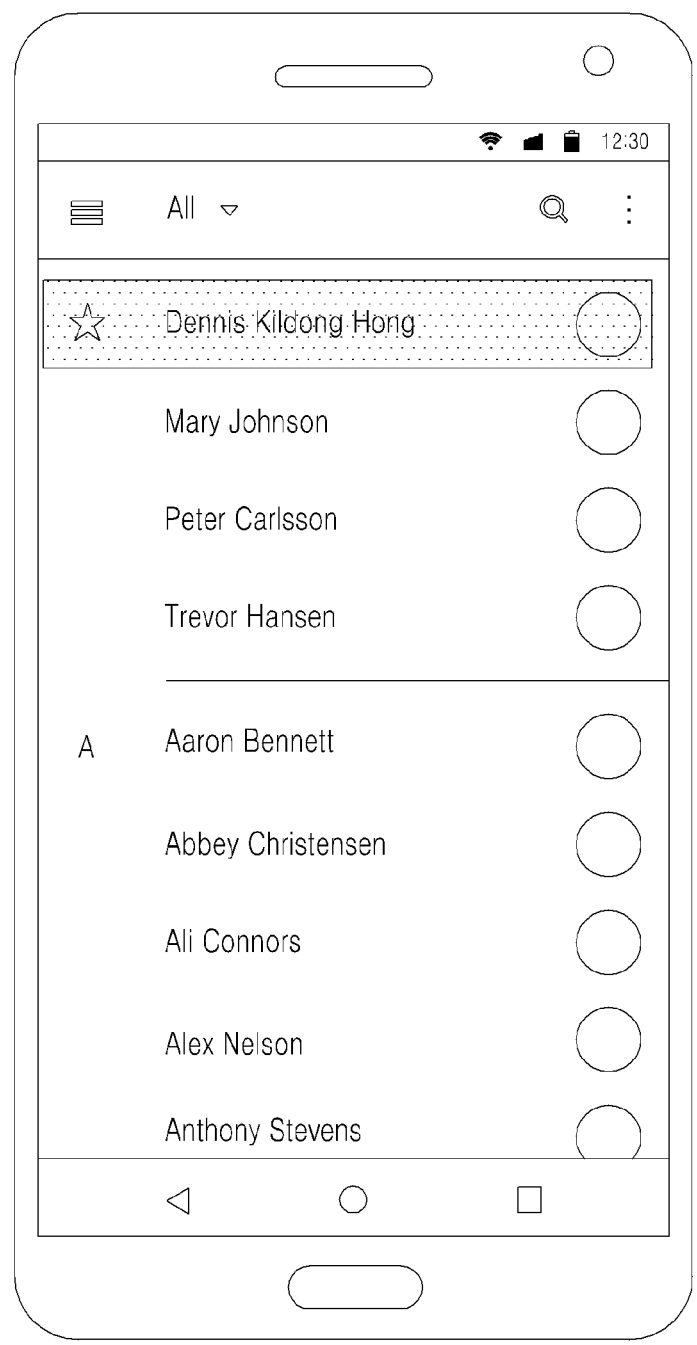
FIGS. 6 to 9 are diagrams illustrating an example of a screen for connecting a telephone call according to the present invention.

FIG. 6 illustrates a screen in which an address book is shown. Dennis Kil-dong Hong is selected from the address book and a telephone call is made thereto.

Figure 7:
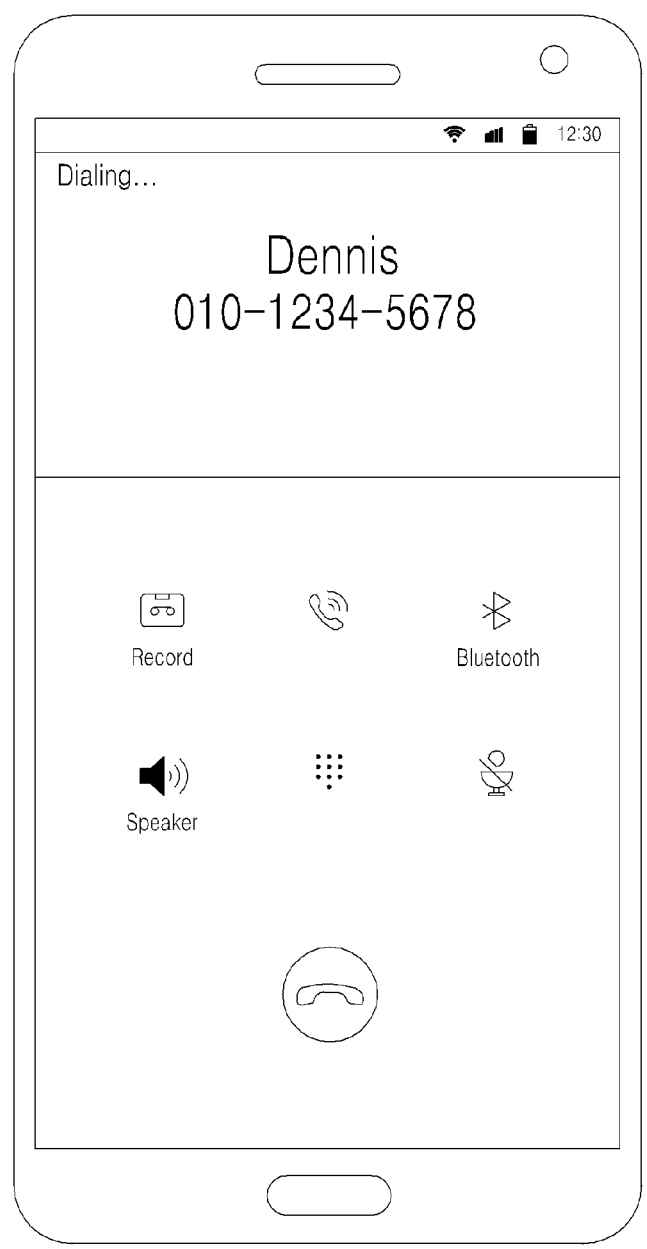

FIG. 7 illustrates an example in which a telephone call is being made to Dennis. Although not shown, '010-1234-5678' is a Koran telephone number.

Figure 8:
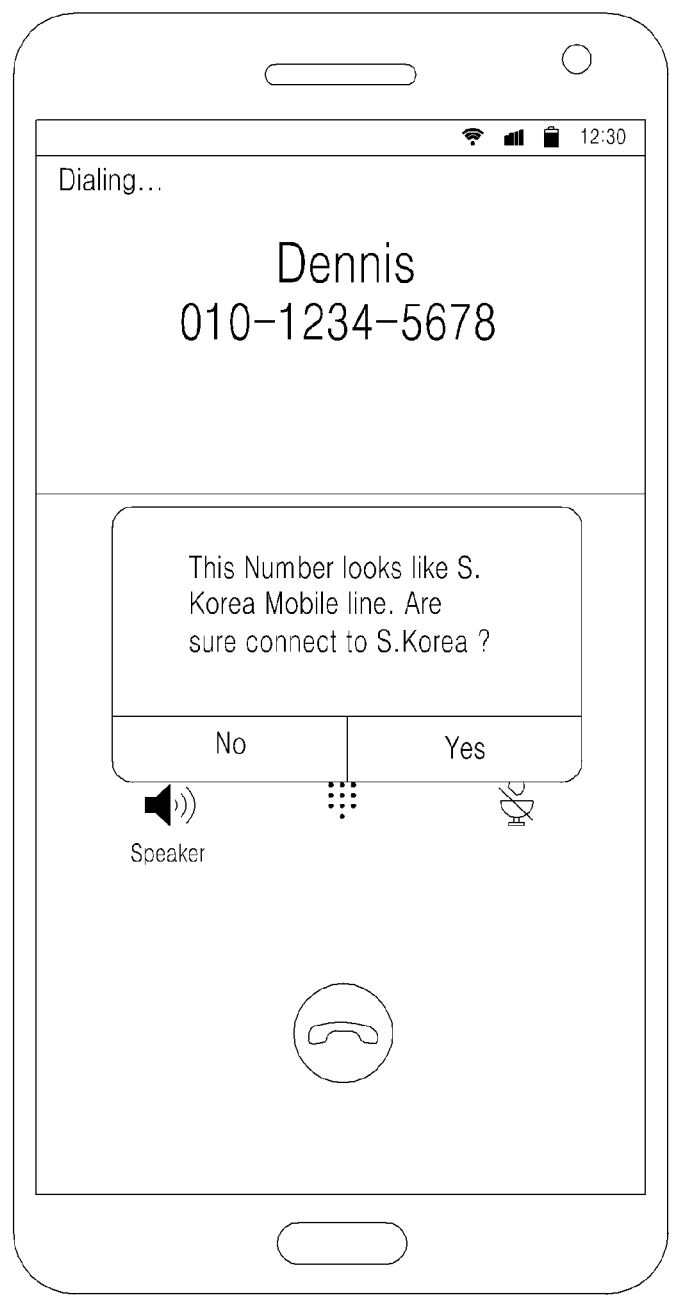

Referring to FIG. 8, according to the present invention as described above with reference to FIG. 4 or FIG. 5, it is determined that '010-1234-5678' belongs to the Korean telephone number system and a confirmation message 'This number looks like a South Korean mobile line. Are you sure to connect to South Korea?' is displayed. The user will press a 'Yes' button.

Figure 9:
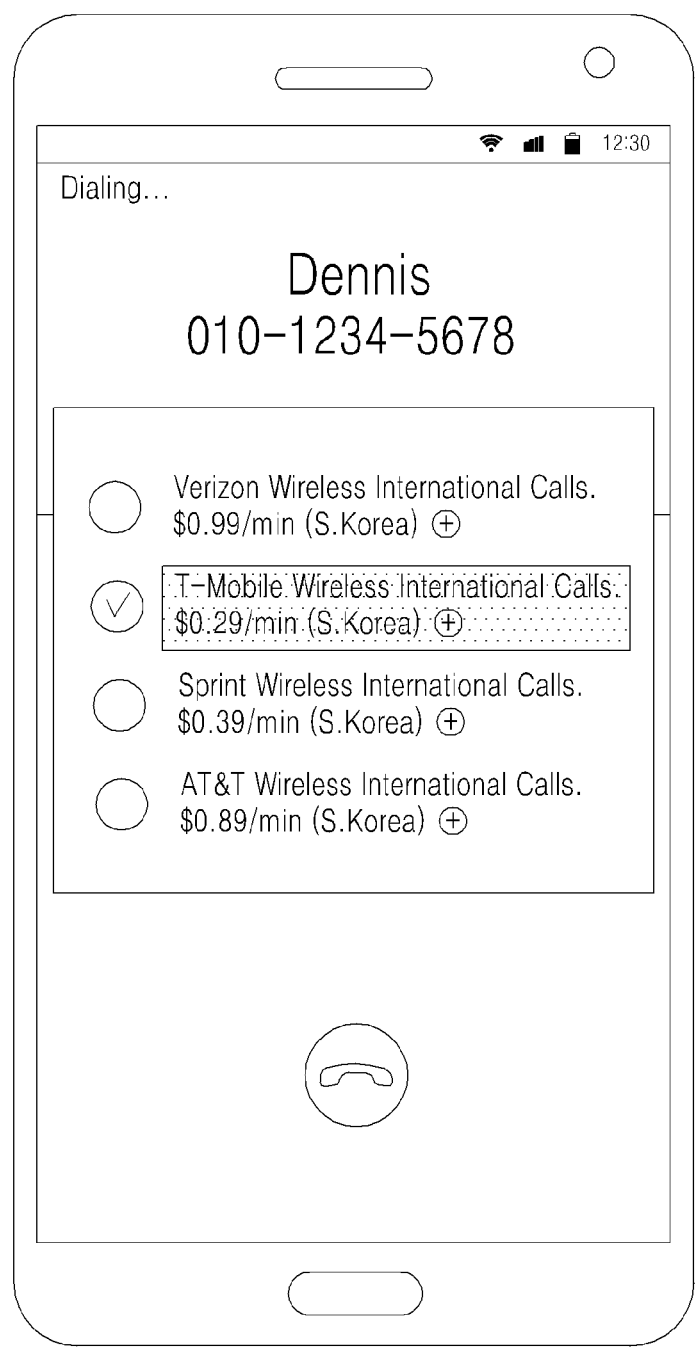

FIG. 9 illustrates a screen displayed when the 'Yes' button is pressed in FIG. 8, and shows a list of international call service providers in the United States where the telephone is currently located and asks about which telecommunications carrier will be used to make an international call. Fares of the international call service providers are preferably presented as one of the selection criteria. FIG. 9 illustrates that 0.99 dollars per minute will be incurred when a telephone call is made to South Korea through Verizon which is a telecommunications carrier, and call charges per minute when a telephone call is made to South Korea through other carriers (T-Mobile, Sprint, and AT&T) are also shown, thereby helping the user to select the cheapest fare. In addition to the fare of each telecommunications carrier, service quality thereof may be a selection criterion and thus the user can have a choice.

Alternatively, it is possible to automatically select and proceed with the lowest calling plan without giving a user a choice.

FIG. 10 illustrates an example of a flowchart according to the present invention.

An example of a scenario according to the present invention has been described above, and will be described from a different viewpoint with reference to FIG. 10 below.

For example, in operation 401, a user makes a telephone call to a target telephone number by using the user terminal 201.

In operation 402, the user terminal 201 identifies a country corresponding to a telecommunications carrier to which the user terminal 201 subscribes. The identification of the country corresponding to the telecommunications carrier may be performed by checking a USIM chip or the like. Alternatively, the identification of the country may be performed after operation 403, and may be performed by the user terminal 201 or the telephone number system analysis logic server 202.

In operation 403, the user terminal 201 transmits the target telephone number to the telephone number system analysis logic server 202. The telephone number system analysis logic server 202 checks whether the target telephone number conforms to the international protocol (the international telephone number system protocol).

In operation 404, the country can be identified when the target telephone number conforms to the international protocol.

In operation 405, when the target telephone number does not conform to the international protocol, the number analysis machine learning system 203 identifies the country corresponding to the target telephone number in cooperation with the country-specific telephone number system information database 205 and the like. In this process, data that has already been learned by machine learning and stored in the country-specific telephone number system information database 205 is used. When the country corresponding to the target telephone number is not identified as one country, two or more countries may be determined as candidate countries.

In operation 406, when the country corresponding to the target telephone number is identified in operation 404 or 405, a message inquiring whether the target telephone number matches a telephone number of the identified country is output to the screen of the user terminal 201. When the country corresponding to the target telephone number is not identified as one country, a message inquiring which country among the candidate countries is the country corresponding to the target telephone number may be output. Although it is described above that the message is output to the screen of the user terminal 201, the message may be output by voice via a speaker of the user terminal 201.

In operation 407, when the country is identified, information (information related to selection of a telecommunications carrier, fare information, etc.) regarding international call service providers in the current calling country is obtained by referring to the country-specific international call service provider information database 204, and is displayed on the screen of the user terminal 201 so that one of the international call service providers can be selected.

In operation 408, when the country corresponding to the target telephone number is identified and an international call service provider through which a telephone call is to be made to the identified country is determined, a corresponding pre-fix is added before the target telephone number based on the telephone call connection logic database 206.

The above example is merely an example of a scenario according to the present invention, and there may be modified examples of an equivalent level of the scenario for implementing the same operation.

For example, it is possible to directly proceed to operation 408 while skipping operations 406 and 407. That is, when the country corresponding to the telephone number is identified in operation 404 or 405, the telephone number may be directly dialed after adding a pre-fix thereto without receiving a user's confirmation about the identified country and/or a telecommunications carrier. In this case, a telecommunications carrier may be randomly selected or the lowest-cost telecommunications carrier when a telephone call is made to the target telephone number may be selected. A guide to the identification of the country and the selection of the telecommunication carrier may be provided to a user (via the screen or the speaker) during or after a telephone call or may not be separately provided to the user.

Alternatively, a process of transmitting the information regarding the target telephone number from the user terminal 201 to the server 202 or the like may be installed, for example, in the form of an application in the case of a smartphone. More preferably, at the time of releasing the smartphone, the above-described procedure (that is, the process of transmitting the information regarding the target telephone number from the user terminal 201 to the server 202 or the like) is set to be implemented by a default telephone call program.

Although exemplary embodiments have been described above, the present invention is not limited thereto, and various modifications may be made therein by the ordinary skilled in the art without departing from the essential ideas of the present invention as set forth in the appended claims. Other various modifications made without departing from the basic ideas of the present invention should be understood to fall within the scope of the present invention.

INDUSTRIAL APPLICABILITY

The present invention relates to a country-specific telephone number system analysis system by the machine learning technique and a telephone call connection method performed using the system, and is industrially applicable.

Sequence List (None)

The invention claimed is:

1. A country-specific telephone number system analysis system comprising:
a telephone number system analysis logic server that is configured to receive a target telephone number to which a telephone call is to be made from a user terminal, and to determine whether the target telephone number conforms to an international telephone number system protocol, wherein the target telephone number is a domestic telephone number;

a number analysis machine learning system that is configured to learn in advance a country corresponding to each telephone number format by machine learning and to store a result of learning in a country-specific telephone number system information database, and is configured to identify a country corresponding to the target telephone number by accessing the country-specific telephone number system information database when the telephone number system analysis logic server determines that the target telephone number does not conform to the international telephone number system protocol;

a country-specific international call service provider information database that is operated in association with the number analysis machine learning system and stores information regarding international call service providers located in each country; and a telephone call connection logic database that is configured to dial the target telephone number after adding a dial code of an international call service provider and a code of the country as prefixes before the target telephone number when the country and the international call service provider are identified by the number analysis machine learning system.

2. The country-specific telephone number system analysis system according to claim 1, wherein when a telephone call request is received from the user terminal, the target telephone number of the telephone call request is received.

3. The country-specific telephone number system analysis system according to claim 1, wherein information stored in the country-specific telephone number system information database is obtained by selecting a specific country, collecting information regarding numbers estimated to be telephone numbers by crawling a plurality of home pages each having a server located in the specific country, identifying a pattern of the numbers, and repeatedly performing the crawling and pattern identification with respect to other countries.

4. The country-specific telephone number system analysis system according to claim 1, wherein when a telephone call request is received from the user terminal, a list of call service providers located in the country where the user terminal is located is displayed on a screen of the user terminal or is output by voice via a speaker of the user terminal, based on information stored in the country-specific international call service provider information database.

5. The country-specific telephone number system analysis system according to claim 4, wherein costs to be incurred when a telephone call is made to the country corresponding to the target telephone number through each of the call service providers listed in the list of call service providers are informed via the screen or the speaker of the user terminal while the list of call service providers is displayed on the screen of the user terminal or is output by voice via the speaker.

6. The country-specific telephone number system analysis system according to claim 3, wherein the information stored in the country-specific telephone number system information database is periodically updated by machine learning.

7. The country-specific telephone number system analysis system according to claim 1, wherein when a country corresponding to the target telephone number of the user terminal cannot be identified, the number analysis machine learning system checks pattern similarities with data stored in the country-specific telephone number system information database and displays a plurality of candidate countries on the screen of the user terminal or outputs the plurality of candidate countries by voice via the speaker of the user terminal.

8. The country-specific telephone number system analysis system according to claim 1, wherein the information regarding the international call service providers stored in the country-specific international call service provider information database comprises information of call charges to be incurred when a telephone call is made to a foreign country through each of the international call service providers.

9. A telephone call connection method which is performed by the country-specific telephone number system analysis system according to claim 1, the telephone call connection method comprising;

(a) a step in which a user terminal attempts to make a telephone call to a target telephone number or transmit a text message to the target telephone number;

(b) a step in which the user terminal transmits the target telephone number to a telephone number system analysis logic server;

(c) a step in which the telephone number system analysis logic server checks whether the received target telephone number conforms to an international telephone number system protocol;

(d) a step in which the telephone number system analysis logic server identifies a country corresponding to the target telephone number when it is determined that the target telephone number conforms to the international telephone number system protocol;

(e) a step in which a number analysis machine learning system which has received the target telephone number from the telephone number system analysis logic server identifies a country corresponding to the target telephone number by accessing a country-specific telephone number system information database when it is determined that the target telephone number does not conform to the international telephone number system protocol; and (f) a step of dialing the target telephone number in consideration of the country identified in the step (d) or (e), wherein the step (f) includes:

selecting one of international call service providers whose information is stored in a country-specific international call service provider information database; and dialing the target telephone number after adding a dial code of the selected international call service provider and a country code as prefixes before the target telephone number.

10. The telephone call connection method according to claim 9, further comprising:

a step in which the user terminal or the telephone number system analysis logic server identifies a country corresponding to a telecommunications carrier to which the user terminal subscribes between the steps (a) and (b) or between the steps (b) and (c).

11. The telephone call connection method according to claim 10, wherein the identification of the country corresponding to the telecommunications carrier to which the user terminal subscribes is performed by checking a USIM chip.

12. The telephone call connection method according to claim 9, wherein the step (f) includes dialing the target telephone number after informing about the country identified in the step (d) or (e) via the screen or speaker of the user terminal and receiving a confirmation about the country.

13. The telephone call connection method according to claim 12, wherein the step (f) includes dialing the target telephone number after additionally providing, via the screen or speaker of the user terminal, a list of call service providers through which a telephone call is to be made to the country identified in the step (d) or (e) from a country where the user terminal is located, based on the information regarding the international call service providers stored in the country-specific international call service provider information database and thereafter receiving a confirmation about the list of telecommunications carriers.

14. The telephone call connection method according to claim 13, wherein the provision of the list of call service providers comprises informing about call charges to be incurred when a telephone call is made or a text message is transmitted through each of the call service providers.

15. A non-transitory computer-readable recording medium having recorded thereon a program or an application for a smart device for implementing the telephone call connection method according to claim 9 in a user terminal.

16. A terminal with a screen and a speaker, the terminal having installed therein a program or an application for a smartphone for implementing the telephone call connection method according to claim 9.

* * * * *